Patented May 16, 1950

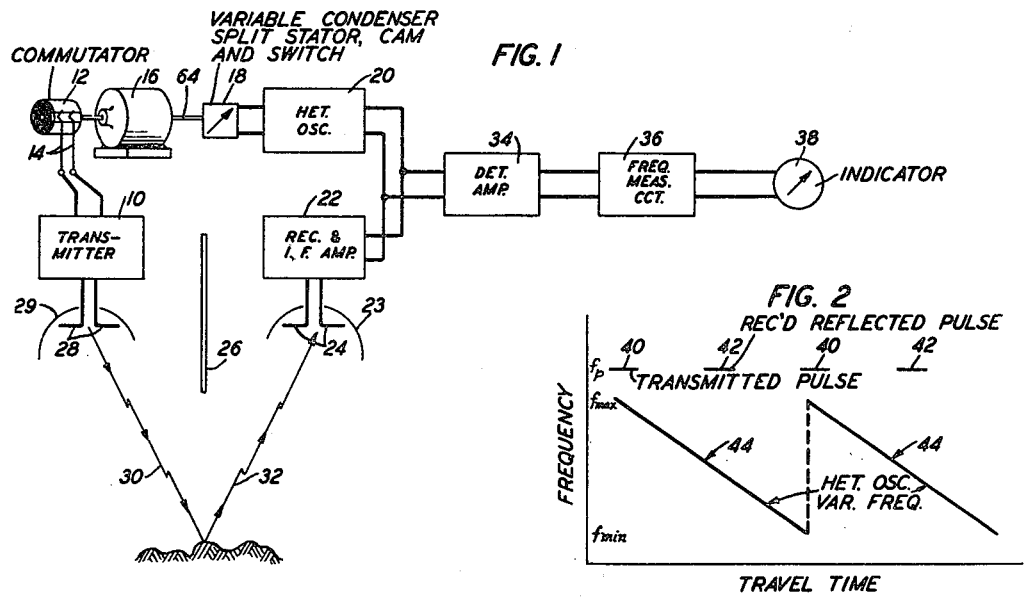
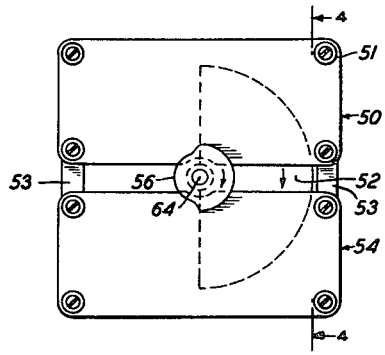
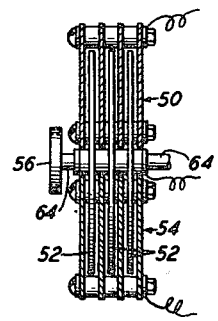
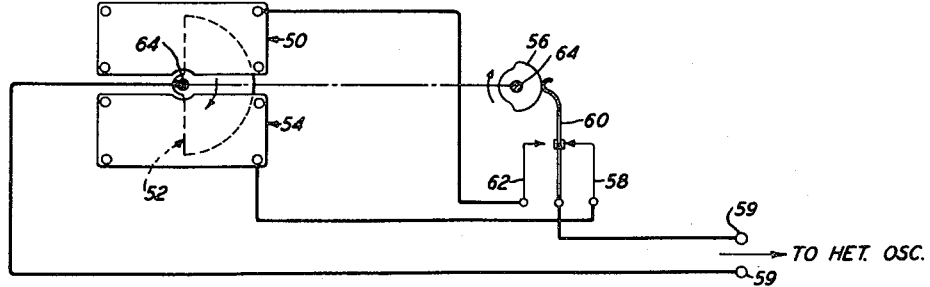

2,507,746

UNITED STATES PATENT OFFICE 2,507,746

PULSE-REFLECTION DISTANCE MEASURING SYSTEM

Henry O. Wright, Suffern, N. Y., assignor to Bell Telephone Laboratories, Incorporated, New York, N. Y., a corporation of New York Application May 1, 1942, Serial No. 441,397

6 Claims. (Cl. 343—13)

This invention relates to improvements in the art of measuring distance by the pulse-reflection method.

In a preferred form the principles of the invention are embodied in an electromagnetic wave pulse-reflection type distance measuring system in which relatively short pulses are transmitted from an observation point to impinge upon a surface, the distance of which is to be measured; reflections of these pulses are received at the observation point and the time of travel of the pulses is determined to obtain the distance from the observation point to the reflecting surface. The required timing is effected by combining the received reflected pulse with a heterodyne frequency which is caused to vary unidirectionally and continuously over a predetermined frequency range during a time interval exceeding the time corresponding to that required for a pulse to be reflected from a surface at the maximum distance which it is desired to measure and determining the frequency of the resulting beat-note pulses to obtain an indication of the distance to the reflecting object. The heterodyne oscillator frequency is varied unidirectionally in a regular manner, preferably in accordance with a substantially straight line, sinusoidal or other convenient law of variation, during the aforesaid interval, starting as a pulse is transmitted, at the end of which interval it repeats its frequency variation cycle starting as a second pulse is transmitted, the cycle of events just described recurring regularly so that a series of beat-note pulses are obtained as will become apparent hereinafter.

Objects of the invention are to provide improved methods of and apparatus for measuring distance.

A further object is to provide an improved method of effecting the timing of electromagnetic wave pulses in a pulse-reflection type radio energy-wave distance measuring system.

Another object is to provide a distance measuring system combining the advantages of the pulse-reflection and the frequency-modulated energy-wave types of distance measuring systems and to avoid a number of the difficulties encountered in such systems of the prior art.

A further object is to provide a simple practicable distance measuring method particularly well suited for use in altimeter and object-locating and the like systems.

Other and further objects will become apparent during the course of the following description and from the appended claims.

The principles of the invention will be more readily understood in connection with the following description of a particular preferred embodiment thereof illustrated by the accompanying drawing in which:

Fig. 1 shows in block schematic diagram form a radio-wave distance measuring system of the invention;

Fig. 2 illustrates the sequence of events throughout two operational cycles of the system of Fig. 1; and Figs. 3 to 5, inclusive, show structural details of a variable condenser and cam-operated switch for suitably controlling the frequency modulation of the heterodyne oscillator of the system of Fig. 1.

In more detail, in Fig. 1 a motor 16 carries on the left end of its shaft a commutator 12 which closes the circuit between brushes 14 for a brief interval twice during each revolution of the shaft and causes radio transmitter 10 to energize antenna 28 to emit a short pulse of energy toward a reflecting surface 31.

On the right end of the shaft of motor 16 is mounted a rotary variable capacitance 18 which varies continuously from minimum to maximum capacity twice during each revolution of the motor, each capacity variation cycle commencing with the closure of the circuit of brushes 14 and ending just prior to the next closure of this circuit. A suitable variable capacitance is illustrated in Figs. 3 to 5, inclusive, and described below.

Variable condenser 18 is connected electrically in the frequency-determining circuit of heterodyne oscillator 20.

Wave 30 represents transmitted pulses emitted from antenna 28 and wave 32 represents reflections thereof returning to receiving antenna 24 which is connected to receiver 22 in which they can be detected and amplified. The outputs of receiver 22 and heterodyne oscillator 20 are introduced into detector amplifier 34 where they are combined to produce a beat-note frequency which is amplified and introduced into a frequency-measuring circuit 36 and the output of which is supplied to an indicator 38. The latter two devices can be of the types described in detail in Patent 2,247,662 issued July 1, 1941, to R. C. Newhouse and designated by numerals 23 and 24 of Fig. 1 of said patent.

A shield 26, as shown in Fig. 1 of this application, is preferably interposed between the transmitting and receiving antennas to prevent the direct reception of the transmitted pulses, unless the antennas are sufficiently directive to prevent such direct transmission without such a shield. Reflectors 29 and 23 increase the directive characteristics of the respective antennas with which they are associated. A reasonably broad directive characteristic is desirable however to avoid the necessity of pointing either antenna to insure that reflections from objects within the intended range of operation will be received by antenna 24. In general radio waves of wave-lengths between 1 centimeter and 1 meter are preferable for use in altimeter and object-locating systems.

Referring to Fig. 2, it is apparent that the beat-note frequencies which result from the combination of the reflected pulses 42 with the heterodyne oscillator output, curve 44, will have a mean frequency dependent upon the time interval between the transmission of a pulse and the receipt of its reflection. The output of the frequency-measuring circuit 36 will in turn be proportional to the mean frequency of the beat-notes received and the indicator 38 can therefore be calibrated to read distance directly. As mentioned above it is preferable that the transmitted pulses 40 should not reach antenna 24 so that the indicator 38 will normally produce no indication unless reflected pulses are being received. Of course a zero setting of the indicator could be made to compensate for the effects of directly received pulses if it is deemed desirable to omit shield 26 and reflectors 23 and 29.

In Figs. 3 and 4 the mechanical structure of a variable capacitance having a single set of rotor plates 52 covering an angle of slightly less than 180 degrees and two sets of stator plates 50 and 54 opposed to each other and each group of stator plates also covering an angle of slightly less than 180 degrees is shown. A cam 56 operating a switch 58, 60 and 62, Fig. 5, serves to alternately connect to one or the other of the two sets of stator plates 50 and 54 so that the effective capacity of the condenser is instantaneously shifted from maximum to minimum at the proper moment to begin the next successive cyclic capacity change. The cam 56 and set of rotor plates 52 are mounted on shaft 64 at the right end of motor 16. Fig. 5 shows the electrical circuit of the variable capacitance and cam-operated switch associated therewith, terminals 59 being connected to the heterodyne oscillator 20.

Systems of the invention have the distinct advantage that the transmitted wave pulses are of substantially constant frequency and yet the advantage of timing by frequency modulation is retained. The design of the transmitter, receiver and their associated antennas, for satisfactory performance is thereby greatly simplified.

Also receiver 22 can preferably as above mentioned include a fixed frequency heterodyne oscillator and intermediate frequency amplification so that considerable latitude in the choice of the location in the frequency spectrum of the frequency range over which heterodyne oscillator 20 can conveniently be varied is readily afforded. Since the output power of the heterodyne oscillator need be only a small fraction of the transmitter output, its design is a relatively simple matter, as compared with that of a high power frequency-modulated transmitter.

Obviously compressional wave systems employing the principles of the invention can readily be constructed and systems embodying the principles of the invention can be employed in timing regularly recurring phenomena in other than distance measuring systems, for example, in the timing of "echoes" or reflections in long metallic circuits, wave guides and the like. The scope of the invention is therefore, obviously, not limited to the preferred illustrative embodiment above described.

For example, if it is deemed desirable, the pulses transmitted can readily be made to vary in frequency at the same rate as frequency of the heterodyne oscillator so that the beat-note frequency pulses will be of uniform frequency throughout each beat-note pulse and numerous other modifications within the scope and spirit of the invention may readily be made by those skilled in the art. No attempt has here been made to exhaustively cover such modifications. The scope of the invention is defined in the following claims.

What is claimed is:

1. A radio distance measuring system comprising a transmitter of substantially constant pure carrier frequency radio-wave energy, means for actuating said transmitter to emit short pulses of radio-wave energy at regularly recurrent time intervals, said intervals being at least of sufficient length to permit a transmitted pulse to travel to a reflecting surface at the maximum distance to be measured and to return by reflection to the system before the next successive pulse is emitted, means separate from and having no effect upon the output of said transmitter, for producing electrical wave energy of a heterodyne frequency continuously varying over a predetermined range of frequencies during each said time interval, means for receiving reflections of said transmitted pulses from a surface the distance of which is to be measured, means for combining said received reflected pulses and said heterodyne frequency energy and detecting the beat-note frequencies therebetween, means for determining the frequencies of said beat-notes to obtain an indication of the distance of said reflecting surface.

2. In a wave-energy pulse-reflection distance measuring system of the type in which energy pulses of substantially constant pure carrier frequency are emitted at predetermined intervals, said intervals being at least of sufficient length to permit a transmitted pulse to travel to a reflecting surface at the maximum distance to be measured and to return by reflection to the system before the next successive pulse is emitted, reflections of said pulses from a remote surface are received and the distance to the remote surface is determined by measuring the time interval between the emission of a pulse and the receipt of its reflection, the method of measuring the reflection time interval which comprises frequency modulating a separate auxiliary source of heterodyne frequency wave-energy continuously, and unidirectionally over a predetermined range of frequencies during the intervals between the emission of successive energy pulses, said separate source having no effect upon the said emitted energy pulses, combining the reflected pulses with energy from said auxiliary source to obtain beat-note pulses and determining the frequency of said beat-note pulses to obtain indications of the reflection time interval of the reflected pulses.

3. A wave-energy distance measuring system of the pulse-reflection type comprising means for emitting wave-energy pulses of substantially constant pure carrier frequency at regular intervals exceeding the reflection time of said pulses from the greatest distance it is desired to measure, means for receiving reflections of said pulses from remote surfaces, a separate auxiliary source of heterodyne wave energy, having no effect upon the output of said emitting means, means for continuously and unidirectionally frequency modulating said auxiliary source over a predetermined frequency range during each interval between successive emitted pulses, means for combining the received reflected pulses with the energy from said auxiliary source to obtain beat-note frequencies and means for determining said beat-note frequencies to obtain an indication of the distance of the surface from which reflected pulses are being received.

4. In a radio distance measuring system, a radio transmitter, a directive antenna cooperatively associated therewith, a radio receiver, a second directive antenna cooperatively associated therewith, a keying means and motive means therefor cooperatively associated with said transmitting apparatus to cause the latter to emit short energy pulses of substantially constant pure carrier frequency at regular intervals, said intervals being at least of sufficient length to permit a transmitted pulse to travel to a reflecting surface at the maximum distance to be measured and to return by reflection to the system before the next successive pulse is emitted, a heterodyne oscillator, a variable impedance element connected in the frequency-determining circuit thereof, motive means cooperatively associated with said variable impedance to vary it through a predetermined range of values during the interval between successive pulses of said transmitter, detecting means electrically connecting to the outputs of said receiver and said heterodyne oscillator, a frequency-measuring circuit electrically connected to the output of said detecting means and an indicator electrically connected to the output of said last-stated circuit whereby when pulses of energy are directed by said transmitting antenna toward a remote object and reflections of said pulses are received from said object by said receiving antenna, an indication of the distance to said object will be obtained.

5. A radio object-detection and distance measuring system comprising a transmitter having a substantially constant pure carrier frequency, a keying device cooperatively connected with said transmitter and periodically operative to cause said transmitter to generate a short energy pulse, the periodicity of said keying device being such that the time interval between successive pulses is at least sufficient for a pulse to travel to a reflecting object at the maximum distance to be measured and to return by reflection to the system before the next successive pulse is generated, an antenna connected to said transmitter to radiate the generated energy pulses, an antenna adapted to receive reflections of the radiated pulses, a receiver and intermediate frequency amplifier cooperatively coupled with said receiving antenna, a heterodyne oscillator having an impedance electrically connected to its frequency determining circuit, said impedance being continuously variable throughout a predetermined range, a mechanism cooperatively coupled with said variable impedance and said keying device to vary said impedance through said range during each time interval elapsing between the keying of successive pulses, a detector the input of which is electrically connected to the output circuits of said receiver-amplifier and said heterodyne oscillator, a frequency measuring circuit electrically connected to the output of said detector and an indicator electrically connected to the output of said last stated circuit.

6. A pulse-reflection timing system comprising an energy pulse emitter, said emitter emitting short pulses of substantially constant pure carrier frequency at intervals at least sufficiently long to permit each pulse to travel to a reflecting surface at the maximum distance to be measured and to return by reflection to the system before the next successive pulse is emitted, a receiver of reflections of the emitted pulses, a separate source of variable frequency heterodyne energy said source having no effect upon the output of said emitter, said source being operatively coupled with said emitter to initiate a cycle of continuous frequency variation over a period exceeding the greatest reflection time to be measured, a combining and demodulating device operatively coupled to said receiver and said variable frequency source providing energy beat notes representing the instantaneous frequency difference between the received reflected pulse and the source of variable frequency, a frequency measuring device operatively connected to said combining and demodulating device and an indicating device operatively connected to said frequency measuring device.

HENRY O. WRIGHT.

REFERENCES CITED

The following references are of record in the file of this patent:

UNITED STATES PATENTS

| Number | Name | Date |
|---|---|---|
| 2,011,392 | Bentley | Aug. 13, 1935 |
| 2,423,644 | Evans | July 8, 1947 |

FOREIGN PATENTS

| Number | Country | Date |
|---|---|---|
| 528,345 | Great Britain | Oct. 28, 1940 |